United States Patent Office 2,775,732
Patented Dec. 25, 1956

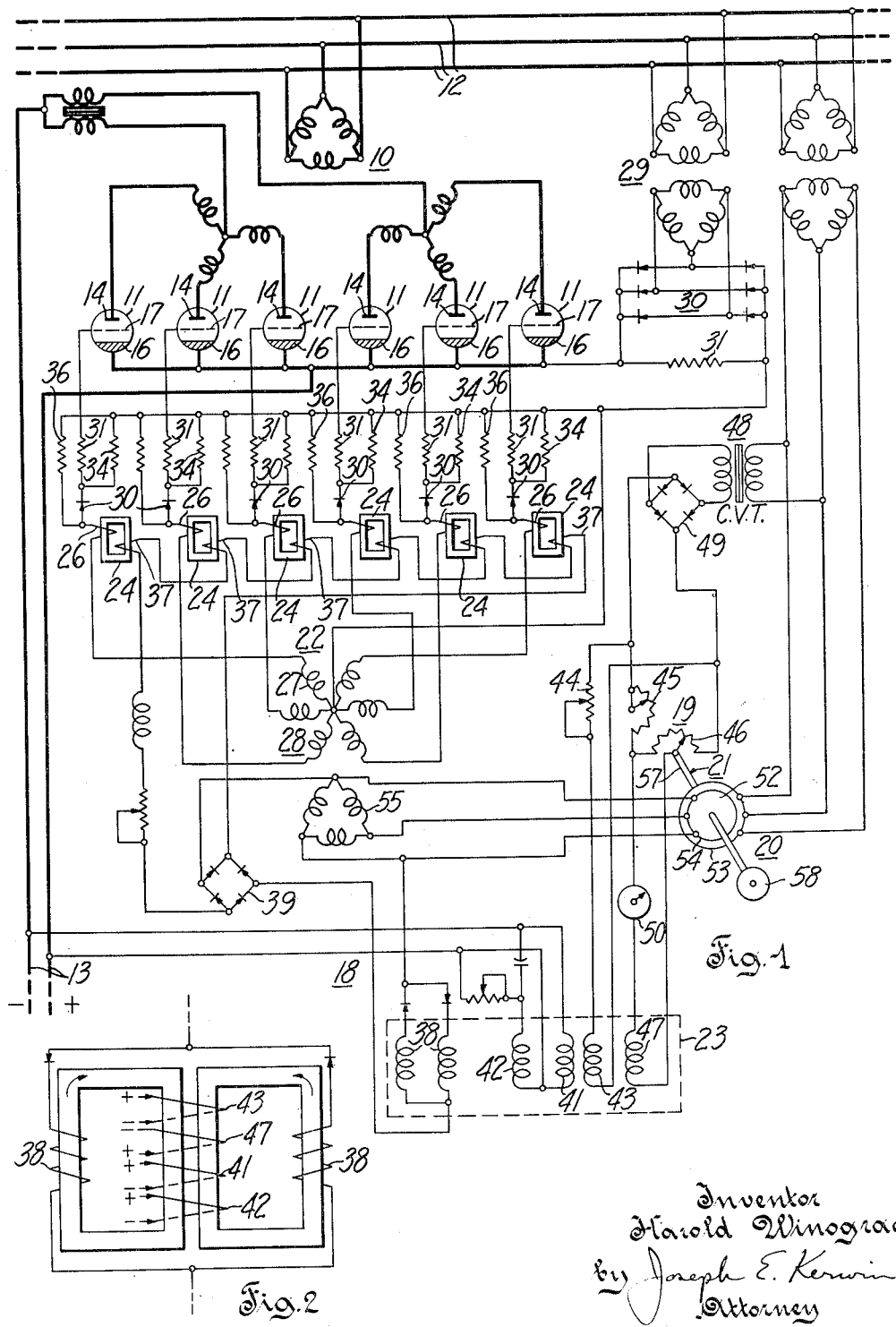

2,775,732

SYSTEM FOR MAINTAINING THE REGULATING MEANS OF AN ELECTRIC CONVERTER OPERATIVE OVER A WIDE RANGE

Harold Winograd, Milwaukee, Wis., assignor to Allis-Chalmers Manufacturing Company, Milwaukee, Wis.

Application October 22, 1953, Serial No. 387,767

8 Claims. (Cl. 321—19)

This invention relates in general to conversion systems utilizing electric valves having control members, and in particular to an improved control system for controlling and regulating the output voltage of such conversion systems.

In the application of conversion systems such as mercury arc rectifiers it sometimes becomes necessary to vary the voltage of the D. C. output circuit over a wide range. This is the case where a D. C. motor is supplied with the output of the rectifier system and where, by controlling this output, wide speed control of the motor under load is provided. Also, it is desirable at times in applications of this type that the output of the system be maintained constant at a preselected value so that the speed of the motor is not affected by variations in supply voltage or the load on the rectifier system.

Known control systems for controlling and regulating an electrical quantity such as the output voltage of an electric current conversion system are usually provided with regulating means for varying the output voltage over a relatively small range, and control means for varying the output voltage over a relatively wide range. When it is desired to increase the output voltage from zero to rated voltage the regulating means is usually switched out of the control system. The regulating means is then suitably adjusted and switched back into the control system after the desired output voltage has been obtained by the voltage control means. This type of system has the disadvantage that it requires a plurality of switching operations and an adjustment of the regulating means for most desired changes in the output voltage of the system.

In other known control systems, as the output voltage is changed from one desired value to another, the regulating means on reaching its limit of operation actuates a limit switch causing a voltage control means to bring the regulating means back into operation. The disadvantage of this system is that there is a substantial time lag between actuation of the limit switch and the time at which the regulating means returns to its operating range.

To overcome these disadvantages the present invention provides an improved control system for an electric current conversion system utilizing electric valves provided with control members for controlling the transmission of energy by said valves between an alternating current circuit and a direct current circuit. The improved control system comprises regulating means which includes means responsive to a condition of one of the circuits for regulating over a relatively small range an electrical quantity of the conversion system. Reference means, which includes an element of the regulating means, is provided for setting the output level of the system at a preselected value. Control means is also provided for varying the electric quantity over a relatively large range. In order to maintain the regulating means operative for various preselected values, linking means, which is responsive to operation of the reference means, is provided to simultaneously operate the control means. By this arrangement the regulating means remains operative for any desired output of the conversion system.

It is therefore an object of the present invention to provide an improved control system for an electric valve converting system which is effective in controlling and regulating the output voltage of the system over a wide range.

Another object of the present invention is to provide an improved control system for an electric valve conversion system which is effective in automatically maintaining the output voltage of the conversion system at a preselected value between zero and rated output regardless of the variations of the voltage of the supply circuit or the load on the system.

A further object of the present invention is to provide an improved controlled mercury arc converter unit whose output may be progressively varied from zero voltage over a wide range and whose output is automatically regulated in response to a predetermined condition of the load circuit.

Objects and advantages other than those mentioned above will be apparent from the following description when read in connection with the drawing in which:

Fig. 1 illustrates diagrammatically an electric valve conversion system embodying the present invention; and Fig. 2 is a schematic view of the magnetic amplifier, illustrated diagrammatically in Fig. 1 showing the position of the various windings on the core.

The preferred embodiment of the invention is illustrated in Fig. 1 and comprises an electric valve conversion system having a transformer 10 and a plurality of electric valves 11 for transmitting power from the alternating current circuit 12 to a direct current load circuit 13.

Electric valves 11 are preferably of the type employing an ionizable medium such as a gas or a vapor, and each valve comprises an anode 14, a self-reconstructing cathode such as a mercury pool cathode 16, and a control member such as a grid 17.

To obtain the desired control and regulation of an electric quantity of the conversion system, it is provided with a control system for controlling the voltage applied to the grids 17. The control system comprises generally regulating means 18, reference means 19, control means 20, and a linking means 21.

While any of the regulator means known in the art could be used, in this instance the regulator means preferred comprises a phase shifting circuit 22 and a magnetic amplifier 23. Phase shifting circuit 22 comprises a plurality of saturable reactors 24, each having a reactive winding 26 connected between a secondary winding 27 of grid transformer 28 and a different one of the grids 17. The grids are energized from grid transformer 28 and as shown are biased negatively with respect to the cathode 16 by means of transformer 29, rectifier 30 and resistor 31. Reactive winding 26 is connected to grid 17 through a unidirectional current conducting device shown as a dry disk rectifier 30, and a resistor 31 which limits the current flow to grid 17. Dry disk rectifier 30 is connected so as to prevent the flow of negative grid current in reactive winding 26. A resistor 34 is connected between the grid 17 and cathode 16 to provide a path for the flow of negative grid current. A loading resistor 36 is provided for each secondary phase of transformer 28.

Each reactor is also provided with a D. C. control winding 37. The current in control winding 37 controls the D. C. magnetization of the reactor which in turn determines the saturation point of the reactor. The voltage supplied to the grids from grid transformer 28 changes abruptly at a point in the cycle at which the reactor becomes saturated. Increasing the magnetizing current advances the point in the cycle at which the grid voltage is abruptly changed to cause the valve 11 to start conducting at an earlier point, and reducing the magnetizing current retards the point in the cycle at which the grid voltage changes abruptly to cause valve 11 to start conducting at a later point. The control windings 37 of all the reactors are connected in series so that by increasing the magnetizing current in the serially connected control windings, the output voltage of the rectifier is increased, and by decreasing this current the output voltage is decreased.

The magnetizing current in the control windings 37 of the reactors is regulated by means of a magnetic amplifier 23 which is also shown schematically in Fig. 2.

The magnetic amplifier has a pair of main windings 38 which are connected to a suitable source of alternating current voltage to supply, through a Graatz rectifier arrangement 39, direct current to the series connected control windings 37. The magnetic amplifier also includes a plurality of control windings which determine the effective impedance of the main windings, thereby controlling the direct current supplied to the serially connected reactor control windings. In order that the regulating means be responsive to a condition of the supply or load circuit, the magnetic amplifier is provided with a feedback winding 41 which is responsive in this instance to an electrical quantity of load circuit 13. As shown, feedback winding 41 is connected across the D. C. output circuit 13 of the rectifier unit and is therefore responsive to the output voltage of that circuit.

Other control windings may also be provided on the magnetic amplifier to improve its operation. As shown in the preferred embodiment of this invention the magnetic amplifier is provided with a damper winding 42 which is also connected across load circuit 13 and is responsive to the rate of change of the D. C. voltage of circuit 13. This winding therefore serves as a stabilizer for the magnetic amplifier. A biasing winding 43 is also provided to set the initial magnetization of the amplifier for optimum utilization of its characteristics. As shown, winding 43 is connected across a source of constant D. C. voltage through a variable resistor 44.

The reference means 19 for setting the output level of the system at a preselected value comprises in this instance a reference voltage rheostat device 46 and an element of the regulating means. As shown, the element of the regulating means comprises a reference voltage winding 47 on the magnetic amplifier, which is connected to a source of constant D. C. voltage such as constant voltage transformer 48 through rectifying arrangement 49. The current in the reference voltage winding 47 is varied by adjustment of reference voltage rheostat device 46. An auxiliary rheostat 45 may also be provided if an additional adjustment is desired.

A meter 50 is connected in circuit between reference winding 47 and rheostat device 46, and may be calibrated in output volts. The setting of rheostat device 46 therefore determines the output voltage of the conversion system.

The control means 20 utilized in the preferred embodiment for varying an electrical quantity of the system such as its output voltage over a wide range comprises a master phase shifting device which operates to shift the phase of the voltage applied to grid transformer 28 over a range of substantially 180 degrees. In this instance, the master phase shifting device 52 comprises an induction voltage regulator having a fixed winding 53 connected to the A. C. supply circuit 12 and a movable winding 54 connected to the primary winding 55 of grid transformer 28. By changing the relative position of the movable winding 54, the voltage of grid transformer 28 is phase shifted with respect to the voltage of the A. C. supply circuit 12, allowing the output voltage of the conversion system to be varied over a relatively large range, e. g., between zero and rated output.

In order to maintain the regulating means 18 operative over this relatively large range, linking means 21 are provided between the reference means 19 and the control means 20 so that the control means is operated simultaneously with operation of the reference means. As shown in the preferred embodiment the linking means comprise a mechanical connection such as a shaft 57 betwen the reference voltage rheostat 46 and the master phase shifter 52. However, any other suitable linking means may be provided which results in simultaneous operation of rheostat device 46 and phase shifting device 52. Shaft 57 may be actuated manually or as shown by means of a motor 58.

In making the initial adjustment of the linking means to obtain the desired cooperation between the reference means and the control means, the regulating means is made momentarily inoperative. Rheostat device 46 is adjusted until meter 50 records a predetermined voltage. The phase shifting device is then adjusted until the output voltage of the system is equal in value to the voltage recorded by meter 50. The rheostat device 46 and the master phase shifting device 52 are then coupled together by shaft 57 so that operation of one of these devices simultaneously operates the other device.

The operation of the system shown in Fig. 1 is substantially as follows. Assuming that the supply circuit 12 is suitably energized with an alternating current voltage and the control system is suitably adjusted so that the output voltage of the system is zero, the reference voltage rheostat 46 is then moved until meter 50 records a desired output voltage. Moving of rheostat 46 causes the current in the reference voltage winding 47 to increase and tends to change the saturation of magnetic amplifier 23. However, since the rheostat 46 and the voltage control means are coupled together by shaft 57, and operate simultaneously, the master phase shifter 52 increases the output of the system a corresponding amount by suitably phase shifting the grid voltage. Feedback winding 41 which is responsive to the voltage of load circuit 13 is energized with a current of suitable value to balance the saturation effect on the magnetic amplifier 23 caused by the current in reference voltage winding 47. The relatively small operating range of the regulator is therefore in effect shifted as the voltage level of the system is changed by rheostat 46, so that the regulating means remains operative over the entire output range of the system. If on reaching the desired value the output voltage should vary because of increased load or a change in supply voltage the difference in the current in feedback winding 41 and reference winding 47 causes the magnetic amplifier 23 to change the current in reactor control windings 37 causing the output voltage of the system to return to the value established by the reference voltage rheostat 46.

From the foregoing description it is readily seen that the output voltage of the illustrated conversion system may be established at any predetermined value from zero to its rated output and the voltage will be maintained at the value automatically regardless of variations in the supply voltage or the load on the system.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In an electric current conversion system having a plurality of electric valves provided with control members for controlling the energy transmitted between an alternating current supply circuit and a direct current load circuit, regulating means including magnetic amplifier means comprising a magnetic amplifier for regulating over a relatively small voltage range the output voltage of said system, said magnetic amplifier means including winding means responsive to a condition of said load circuit; reference means including an element of said winding means for setting the output voltage of said system at a preselected value; control means for varying said output voltage over a relatively large voltage range; and linking means responsive to operation of said reference means to simultaneously operate said control means to maintain said regulating means operative over said large voltage range.

2. In an electric current conversion system having a plurality of electric valves provided with control members for controlling the energy transmitted by said valves between an alternating current circuit and a direct current circuit, regulating means comprising magnetic amplifier means for regulating over a relatively small voltage range the output voltage of said system, said magnetic amplifier means including winding means responsive to the voltage of said load circuit; reference means for setting the output level of said system at a preselected value, said reference means comprising a source of constant direct current voltage, a reference voltage rheostat device, and a reference winding of said winding means, said rheostat device being operable to control the current in said reference winding; control means for varying said output voltage over a relatively large range, said control means comprising a master phase shifting device operable to shift the phase of the voltage applied to said control members with respect to the voltage of said supply circuit; and linking means between said rheostat device and said phase shifting device responsive to movement of one of said devices to simultaneously operate the other of said devices to maintain said regulating means operative over said large voltage range.

3. In an electric current conversion system having a plurality of electric valves provided with control members for controlling the energy transmitted by said valves between an alternating current circuit and a direct current circuit, regulating means for regulating over a relatively small voltage range the output voltage of said system, said regulating means comprising a phase shifting circuit and magnetic amplifier means, said magnetic amplifier means having a pair of main windings and a plurality of control windings including a feedback winding responsive to the voltage of said load circuit; reference means for setting the output level of said system at a preselected value, said reference means comprising a source of constant direct current voltage, reference voltage rheostat means, and a reference winding on said magnetic amplifier means, said rheostat means being operable to control the current in said reference winding; control means for varying said output voltage over a relatively large range, said control means including a master phase shifting device of the induction voltage regulator type operable to shift the phase of the voltage applied to said control members with respect to the voltage of said supply circuit from a substantially in phase relationship to substantially 180 degrees out of phase relationship; and linking means between said rheostat means and said phase shifting device, said linking means comprising a shaft responsive to movement of said rheostat means to simultaneously operate said phase shifting device to maintain said regulating means operative over said large voltage range.

4. In an electric current conversion system having a plurality of electric valves provided with control members for controlling the energy transmitted by said valves between an alternating current circuit and a direct current circuit, regulating means for regulating over a relatively small voltage range the output voltage of said system, said regulating means comprising a phase shifting circuit and a magnetic amplifier, said phase shifting circuit comprising a source of periodic potential connected to said control members for periodically exciting said valves in sequence, saturable reactor means for varying within a relatively small range the time at which said valves are excited, and premagnetizing windings for said reactors to vary the saturation thereof in response to a control current, said magnetic amplifier comprising main windings for supplying said control current and a plurality of control windings including a feedback winding responsive to the voltage of said load circuit; reference means for setting the output level of said system at a preselected value, said reference means comprising a source of constant direct current voltage, a reference winding on said magnetic amplifier, and a reference voltage rheostat in circuit with said reference winding to control the current therein; control means for varying said output voltage over a relatively large range, said control means including a master phase shifter operable to shift the phase of said periodic potential applied to said control members with respect to the voltage of said supply circuit from a substantially in phase relationship to 180 degrees out of phase relationship; and linking means between said rheostat means and said phase shifter, said linking means comprising a shaft responsive to movement of said rheostat means to simultaneously operate said phase shifter to maintain said regulating means operative over said large voltage range.

5. An electric current conversion system comprising an alternating current circuit, a direct current circuit, a plurality of electric valves connected between said circuits, said valves being provided with control members, means for applying a voltage to said control members to control the energy transmitted between said circuits by said valves, regulating means operable in response to a condition of one of said circuits to control the voltage applied to said control members for regulating over a relatively small range an electric quantity of said system, reference means including an element of said regulating means for setting the output level of said system at a preselected value, control means operable to control said voltage applied to said control members for varying said electric quantity over a relatively large range, and linking means responsive to operation of said reference means to simultaneously operate said control means to maintain said regulating means operative over said large range.

6. An electric current conversion system comprising an alternating current supply circuit, a direct current load circuit, a plurality of electric valves connected between said circuits, said valves being provided with control members, means for applying a voltage to said control members to control the energy transmitted between said circuits by said valves, regulating means operable in response to a condition of one of said circuits to control the voltage applied to said control members for regulating over a relatively small range an electric quantity of said system, reference means including an element of said regulating means for setting the output level of said system at a preselected value, control means operable to control said voltage applied to said control members for varying said electric quantity over a relatively large range, and linking means responsive to operation of said reference means to simultaneously operate said control means to maintain said regulating means operative over said large range.

7. An electric current conversion system comprising an alternating current supply circuit, a direct current load circuit, a plurality of electric valves connected between said circuits, said valves being provided with control members, means for applying a voltage to said control members to control the energy transmitted between said circuits by said valves, regulating means operable in response to the voltage of said load circuits to control the voltage applied to said control members for regulating over a relatively small range the output voltage of said system, reference means including an element of said regulating means for setting the output level of said system at a preselected value, control means operable to control said voltage applied to said control members for varying said output voltage over a relatively large range, and linking means responsive to operation of said reference means to simultaneously operate said control means to maintain said regulating means operative over said large range.

8. An electric current conversion system comprising an alternating current circuit, a direct current circuit, an electric valve connected between said circuits, said valve being provided with a control member, means for applying a voltage to said control member to control the energy transmitted between said circuits by said valve, regulating means operable in response to a condition of one of said circuits to control the voltage applied to said control member for regulating over a relatively small range an electric quantity of said system, reference means including an element of said regulating means for setting the output level of said system at a preselected value, control means operable to control said voltage applied to said control member for varying said electric quantity over a relatively large range, and linking means responsive to operation of said reference means to simultaneously operate said control means to maintain said regulating means operative over said large range.

References Cited in the file of this patent

UNITED STATES PATENTS

| | | |
|---|---|---|
| 2,556,129 | Wellons | June 5, 1951 |
| 2,604,618 | Bixby | July 22, 1952 |
| 2,609,527 | Raburn et al. | Sept. 2, 1952 |
| 2,611,889 | Huge | Sept. 23, 1952 |
| 2,621,321 | Holt | Dec. 9, 1952 |